March 22, 1938.   E. C. HORTON   2,112,197
WINDSHIELD CLEANER FOR BUSES
Filed Sept. 13, 1933   4 Sheets-Sheet 1
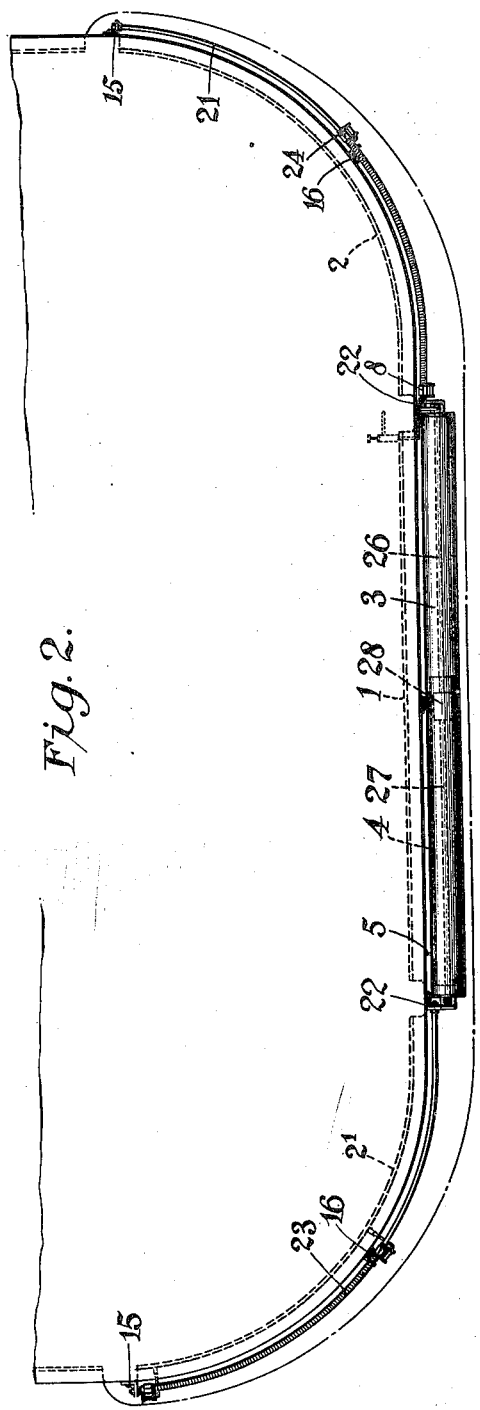
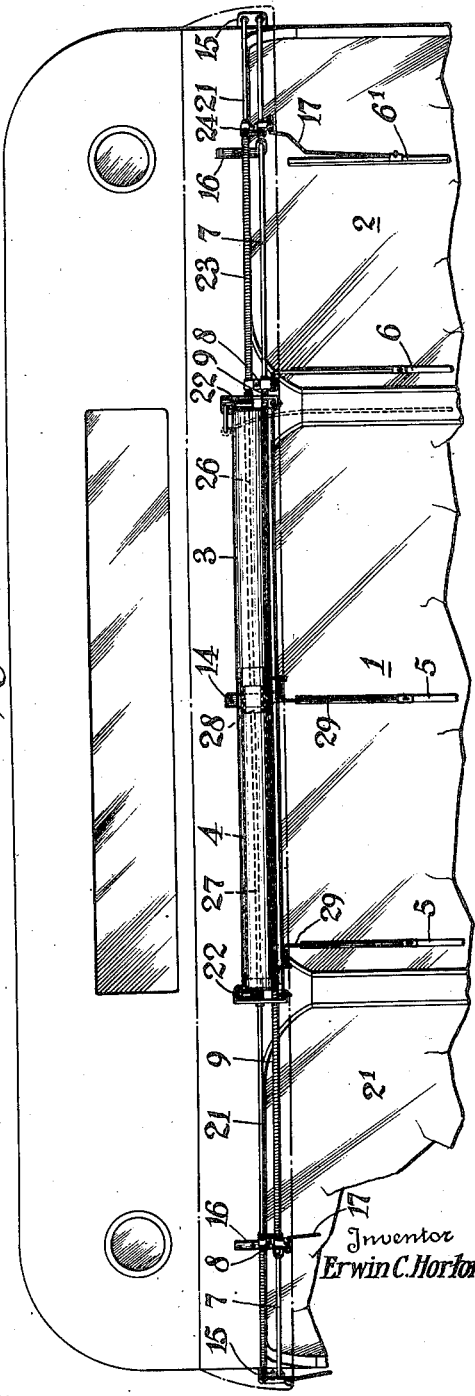
Inventor
Erwin C. Horton
By Bean & Brooks. Attorneys March 22, 1938.  E. C. HORTON  2,112,197
WINDSHIELD CLEANER FOR BUSES
Filed Sept. 13, 1933  4 Sheets-Sheet 2
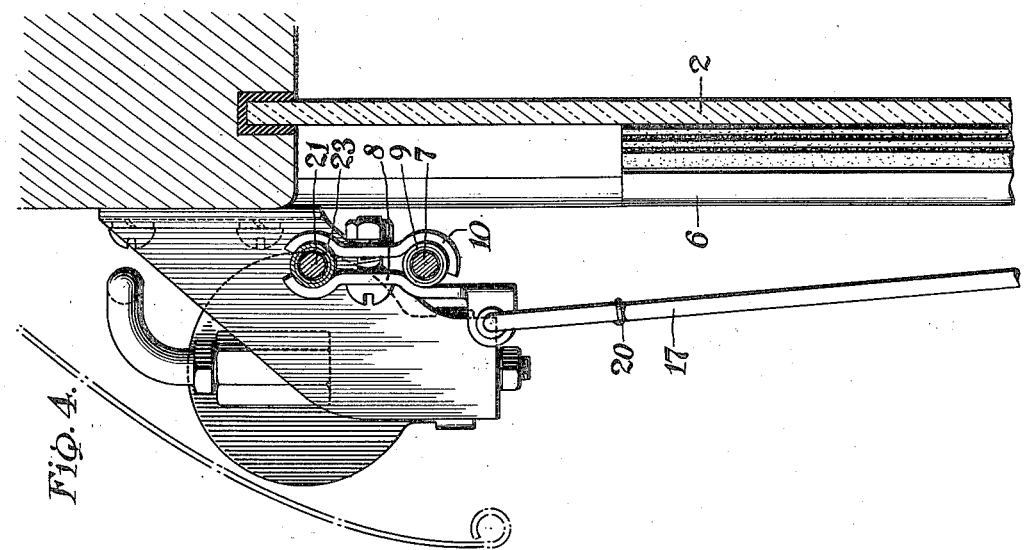
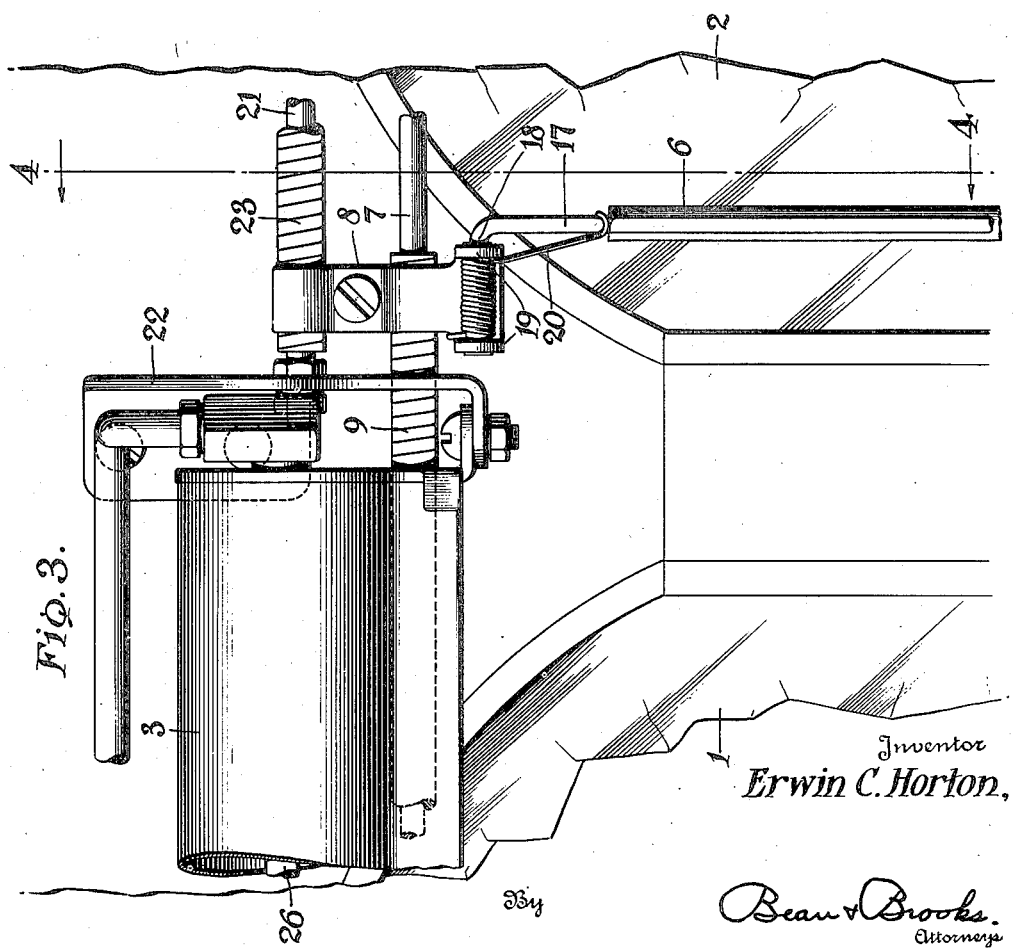
Inventor
Erwin C. Horton,
By Bean & Brooks
Attorneys

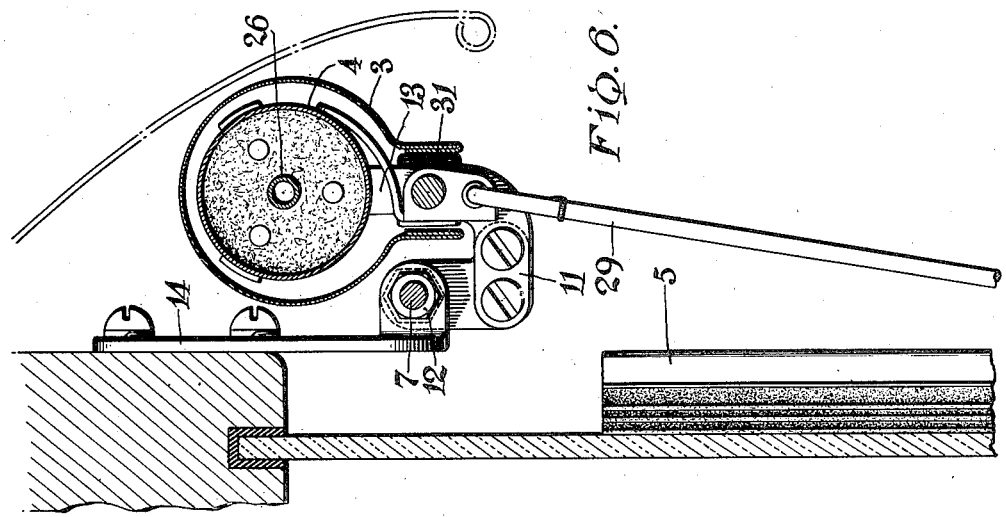
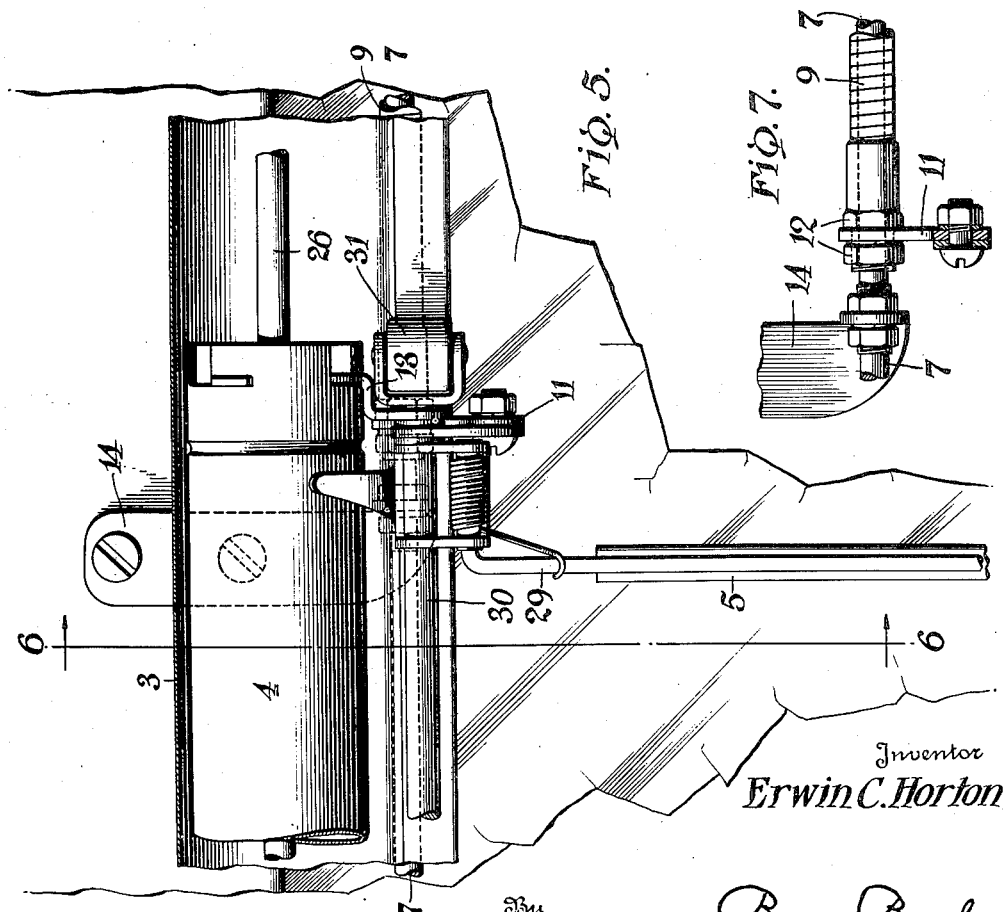

March 22, 1938.  E. C. HORTON  2,112,197
WINDSHIELD CLEANER FOR BUSES
Filed Sept. 13, 1933  4 Sheets-Sheet 4
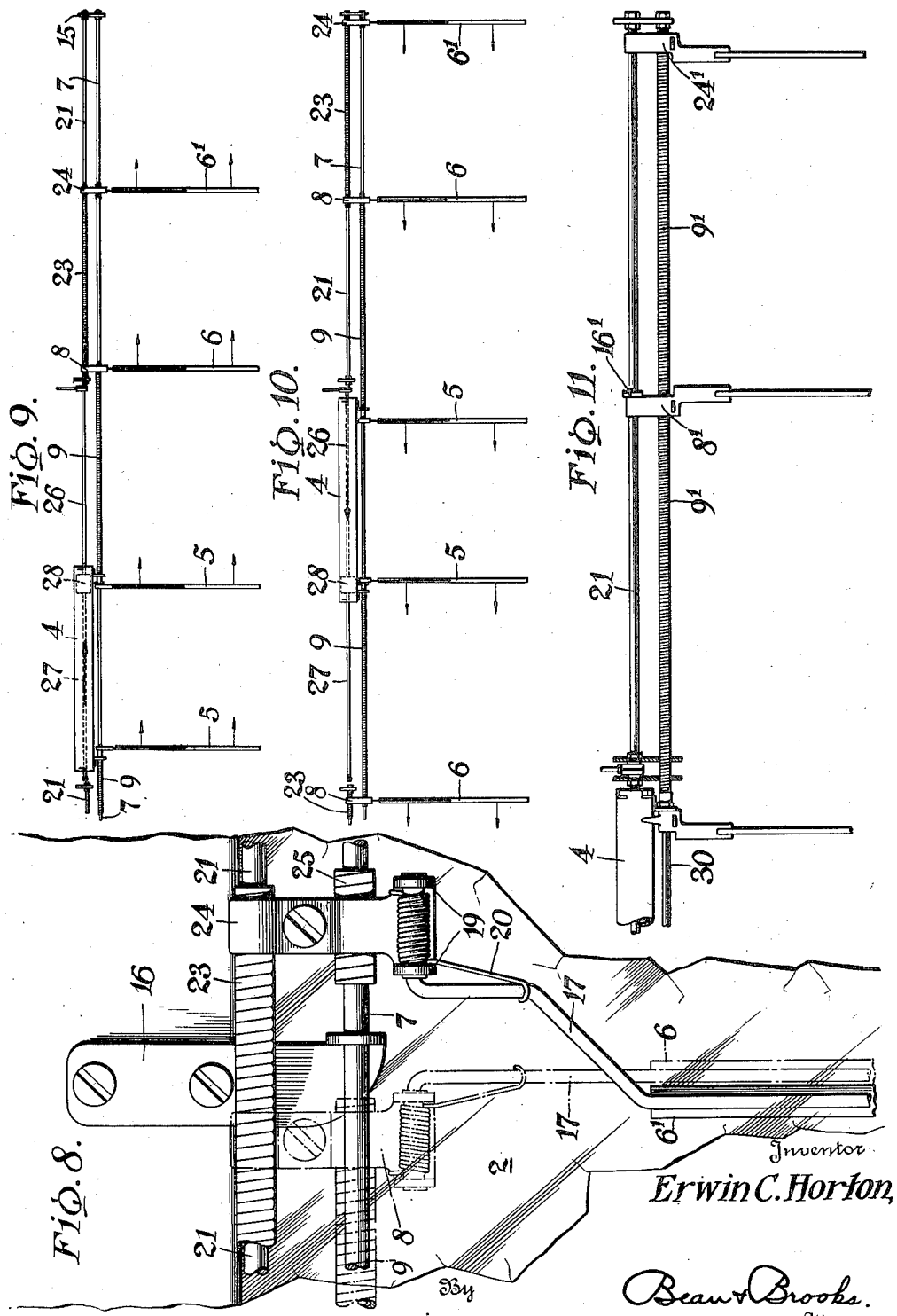
Inventor
Erwin C. Horton,
By Bean & Brooks.
Attorneys Patented Mar. 22, 1938

2,112,197

UNITED STATES PATENT OFFICE 2,112,197

WINDSHIELD CLEANER FOR BUSES

Erwin C. Horton, Hamburg, N. Y., assignor to Trico Products Corporation, Buffalo, N. Y.

Application September 13, 1933, Serial No. 689,257

19 Claims. (Cl. 15—253)

This invention relates to windshield cleaners and has for its primary object to increase the cleaned area of the windshield so that a greater field of vision is obtained.

Motor buses which are now in operation are of large proportions and have an extensive front window area so as to increase the field of vision of the driver of the bus and thereby provide for a greater margin of safety in the operation and handling of the huge vehicle. The modern bus is provided with laterally disposed windowed portions which are curved around to the side and which flank on each side of the main windshield or window directly in the front of the vehicle. This main window is usually flat and for this reason the windshield wiper is applied thereto, leaving the vision through the laterally disposed, curved windows blurred and obscured by the drops of moisture thereon.

The present invention therefore aims to provide a windshield cleaner which will clean the curved window surfaces and thereby increase the visibility through the front end of the bus; and further to operate the cleaner for the curved window surface in conjunction with and by the cleaner for the centrally disposed flat window surface.

In the drawings:

Fig. 1 is a fragmentary front elevation of a bus equipped with a windshield cleaner embodying the present invention.

Fig. 2 is a top plan view thereof showing more clearly the curved side window surfaces.

Fig. 3 is an enlarged view of the wiper carriage and its mounting.

Fig. 4 is a view taken about on line 4—4 of Fig. 3, further showing the wiper carriage and mounting.

Fig. 5 is an enlarged fragmentary showing of the windshield cleaner motor and its connection to the carriage coupling sleeve.

Fig. 6 is a view thereof taken about on line 6—6 of Fig. 5.

Fig. 7 is a detailed view thereof.

Fig. 8 is an enlarged fragmentary view depicting the supplemental wiper carriage.

Figs. 9 and 10 are diagrammatical views illustrating more clearly the operation of the present invention.

Fig. 11 depicts a slightly modified form of the invention.

Referring more particularly to the drawings, the motor bus is provided with a centrally disposed flat front windshield or window 1 flanked by left and right windshields or windows 2 and 2' which are frequently curved, the whole providing a window arrangement somewhat similar to a bay window so as to afford a wide range of vision for the bus driver without undue obstruction. The term window is used hereinafter with a generic meaning and includes any transparent windshield.

The windshield cleaner motor has a casing 3 and a movable part 4 for operating one or more wipers 5 so as to clear the window 1 of moisture and other vision obscuring matter thereon. A wiper 6 is provided for the left curved window 2, such wiper being carried by a suitable carriage structure which follows a path of travel about the curved window surface as defined by a guide member or track 7. This track is in the form of a rod and supports a carriage 8 which is connected to the moving part 4 of the motor by a flexible coupling member 9 herein illustrated as a tube or sleeve. Such flexible tube is designed to freely slide back and forth on the track 7 and follow the contour of the latter without binding or causing undue frictional contact therewith. The carriage 8 may be attached to one end of the coupling sleeve 9, as by a clamp part 10. The opposite end of the coupling sleeve is connected by a bracket 11 to the moving part 4 of the windshield cleaner motor (Figs. 5, 6, and 7), the bracket being clamped to the coupling member 9, as by nuts 12, and to the moving part 4, as by arm 13.

The track or guide rod 7 is supported at its opposite ends by brackets 14 and 15 and at its intermediate portion by a bracket 16. As the motor part 4 is reciprocated the connected carriage 8 will likewise move between the brackets 14 and 16 and cause the wiper 6 to clean the curved window section 2. The wiper is supported on the carriage 8 by a wiper carrying arm 17 which has a pintle 18 engaged in the bearing 19 and urged toward the glass by a spring 20.

Means are provided for holding the carriage against turning about the axis of the rod 7. For this purpose a second rod or track 21 is mounted parallel to the main track 7, although it may be of shorter length, and one end of this guide rod 21 is supported in the mounting bracket 22 of the windshield cleaner motor while the opposite end is mounted in the bracket 15. The carriage 8 and the clamp member 10 are extended to embrace a connector sleeve 23 on the secondary guide rod 21 so as to have guiding contact therewith.

For cleaning an additional area of the curved window 2 a supplemental wiper 6' may be mounted on a carriage 24 which is provided with a sleeve 25 slidable back and forth over the rod 7 between the brackets 15 and 16. This supplemental or secondary carriage 24 may be coupled to the first carriage 8 by the sleeve 23, which latter is extended to a point to be engaged by the carriage 24, as is illustrated in Fig. 8. Or the carriage 24 may be connected directly to the coupling sleeve 9 by eliminating the bracket 16 and extending said sleeve to the wiper 6'. Such a modified form is shown in Fig. 11 wherein the sleeve 9' extends from the moving part 4 of the motor beyond the carriage 8' to the carriage 24', being connected to both carriages for moving the same in unison. The bracket 16 is provided to give the required support and stability to the wiper supporting rod 7 but in the modified form the bracket 16' may directly support the guide rod 21 and, through the connecting carriages, the main track will receive proper support for guiding the carriages back and forth.

The windshield cleaner motor may be of any reciprocatory type although in the drawings a motor has been illustrated partaking of the form disclosed in the patent to Henry Hueber, No. 1,716,135, on an Automatic windshield cleaner, granted June 4, 1925, wherein the moving part 4 of the motor is in the form of a cylinder sliding back and forth on fluid pipes 26 and 27 over a stationary piston 28, the piston being provided with suitable valve mechanism (not shown) for operatively applying fluid pressure impulses to the cylinder 4 so as to reciprocate it. The windshield wipers 5 are supported from the cylinder 4 for movement therewith by arms 29 which are suspended from the frame member 30. This member 30 is in turn supported by the arm 13 and to which latter the sleeve 9 is connected, there being a guide roller 31 to ride along the casing 3 as the cylinder reciprocates.

In operation the windshield cleaner motor is set in motion so as to cause the coupling sleeve 9 to slide back and forth on the track 7 and accordingly push and pull the carriages 8 and 24 back and forth in the path defined by the curved track 7. (The carriages 8 and 24 with their connecting sleeve 23 move as a unit and therefore may be considered as a composite carriage.) The auxiliary wipers 6 and 6', being thus constrained, will move over the curved glass surface of the window 2 to clean the latter for clear vision therethrough.

Where desired, a second set of auxiliary wipers may be associated with the right curved window 2' of the bus (shown to the left in Fig. 1), such second auxiliary set of wipers being mounted and actuated in a manner similar to that previously described for the left curved window directly in front of the driver and the several corresponding parts thereof have been given like characters for reference. To accomplish this, the track rod 7 may be continued through the bracket 14 (as in Fig. 7), and extended above the right front window 2' in conformity with the curvature thereof, Figs. 1 and 2. This additional provision will provide an increased field of vision for large motor vehicles and buses having angularly related or curved front window portions. The length of the stroke is preferably such that the paths of the companion wipers of each group overlap each other at their ends, as is indicated in Fig. 8. Consequently, the cleaned area of each window section will approximate twice the length of each wiper path.

What is claimed is:

1. A windshield cleaner for curved windshields of motor vehicles, comprising a track substantially conforming in curvature to the surface to be cleaned, a wiper for said windshield mounted on said track for back and forth movement, and means for reciprocating said wiper, said means including a flexible coupling member slidably embracing said track and conformable to the curvature thereof.

2. A windshield cleaner for curved windshields of motor vehicles, comprising track means substantially conforming in curvature to the surface to be cleaned, a wiper for said windshield mounted on said track means for back and forth movement, means for reciprocating said wiper, a second wiper mounted on said track means and spaced from the first wiper, and a flexible connector coupling said wipers together for movement in unison and itself slidably engaging said track means substantially throughout to conform to the curvature of the windshield.

3. A windshield cleaner for curved windshields, comprising a track substantially conforming in curvature with the surface to be cleaned, a wiper for said windshield mounted on said track for back and forth movement, means for reciprocating said wiper, a second wiper mounted on said track and spaced from the first wiper, a guide member adjacent said track and substantially following the curvature thereof, a flexible tube mounted on the guide member and conformable to the curvature thereof, and means connecting said spaced wipers to said flexible tube.

4. A windshield cleaner for curved windshields comprising a rigid track substantially conforming to the curvature of the windshield, a wiper for said windshield mounted to reciprocate on said track in a curved path defined thereby, and means for reciprocating said wiper on the track including a flexible push-pull member slidably guided by the track throughout the curvature of the latter substantially up to the point of connection of said flexible push-pull member to said wiper.

5. A windshield cleaner for curved windows of motor vehicles, comprising a curved self-sustaining rod substantially conforming in curvature to the curved window surface, a wiper for cleaning such window surface, carriage means slidably mounting said wiper on said rod, and means for reciprocating said carriage means including a flexible push-pull member slidably embracing and supported by said rod substantially throughout the curvature of the latter up to the point of connection between said push-pull member and said carriage means.

6. A window cleaner for motor vehicles having a substantially flat front window flanked by a curved side window, comprising wiper means for the flat front window, wiper means for the curved side window, vehicle supported track means extending from said first named wiper means and conforming the movement of said second wiper means to the curvature of said curved window, and means upon the track means coupling the second wiper means to said first wiper means for operation thereby.

7. A cleaner for the curved windows of motor vehicles, comprising operating means having a part movable back and forth, wiper means for cleaning the window surface, a vehicle supported track means supporting said wiper means for movement back and forth and constraining the wiper means substantially to the curvature of the window, and a flexible tube coupling said wiper means to said operating means and slidably supported by said track means.

8. A windshield cleaner for motor vehicles having a curved glazed surface, comprising a motor having a reciprocatory part movable in a straight path, wiper means movable rectilinearly back and forth by said part over said curved glazed surface and movably connected to said part for actuating the same, wiper supporting means constraining the rectilinear movement of said wiper means to a curved path substantially following the curvature of the glazed surface, the straight path being disposed substantially tangential to the curved path, and means for keeping said wiper means in wiping contact with said curved surface.

9. A window cleaner for motor vehicles having a substantially flat front window and a flanking window curving from the flat window with the plane of the former substantially tangent to the curvature of said flanking window, comprising a cleaner operator having a part movable back and forth adjacent the flat window in a substantially straight path, wiper means operable by said part for cleaning the flat window, other wiper means for cleaning the curved window and coupled to the first wiper means for back and forth movement therewith and curved means slidably supporting said other wiper means for movement constrained to follow the curvature of said curved means and said curved window, the straight path being disposed substantially tangential to said curved means.

10. A windshield cleaner for curved windows of motor vehicles, comprising a wiper, means supported by the vehicle for reciprocating said wiper, and means substantially conforming in curvature to the window surface to be cleaned and supporting said wiper means, said wiper reciprocating means including a flexible linear push and pull member guidingly supported by said conforming means and connected to the wiper for causing the latter to traverse the curved window surface.

11. A cleaner for the curved windows of motor vehicles, comprising wiper means for cleaning the curved window surface, operating means having a part movable back and forth above and conforming to the curved window surface, a vehicle supported curved track means supporting said wiper means for movement back and forth over and about the curved window surface and from one portion of the curved window surface to an adjacent and angularly disposed portion of the curved window surface constraining the wiper movement substantially to the curvature of the window surface, and means coupling said wiper means to said part of said operating means and acting to push and pull said wiper means back and forth on the curved track means.

12. A window cleaner for curved windows of motor vehicles, comprising a wiper, means supported by the vehicle for reciprocating said wiper, and means substantially conforming in curvature to the surface to be cleaned and providing guiding support for the wiper, said wiper reciprocating means including a push and pull member connected to said wiper for pushing and pulling the latter about a curved path across the curved window surface as constrained by said conforming means, said propelling force being always applied to the wiper within the plane of movement of the latter.

13. A cleaner for the curved windows of motor vehicles, comprising wiper means for cleaning the curved window surface, operating means having a part movable back and forth, a vehicle supported curved track means supporting said wiper means for movement back and forth and constraining the wiper movement substantially to the curvature of the window surface, and means slidably supported by said track means and coupling said wiper means to the reciprocating part of said operating means and conformable by said track means during reciprocation to push and pull said wiper means back and forth on the curved track means.

14. A window cleaner for curved windows of motor vehicles, comprising a wiper, means supported by the vehicle for reciprocating said wiper, and means substantially conforming in curvature to the surface to be cleaned and providing guiding support for the wiper, said wiper reciprocating means including a push and pull member connected to said wiper and substantially conforming to the curvature of the guiding support means for pushing and pulling the latter about a curved path across the curved window surface as constrained by said conforming means, the propelling force being always applied to the wiper within the plane of movement of the latter.

15. A window cleaner for motor vehicles having a curved window comprising a wiper means, a track means for supporting said wiper in wiping contact with said curved window, said track means being supported by the vehicle and coextensive with the curvature of said window, and reciprocating means operably mounted on said vehicle adjacent said curved track and operably connected to said wiper means for reciprocating the latter on said track and across said curved window, said reciprocating means including a coupling means supported by and conforming to the curved track means.

16. A windshield cleaner for a motor vehicle having a plane windshield portion and a curved windshield portion, comprising a track means supported by said vehicle and having a straight portion and a curved portion each of said portions being coextensive with a corresponding part of said windshield, a wiper means slidably mounted on each portion of said track means, means on one of said track means for reciprocating one of said wiper means, and a coupling means slidably mounted on said track means and operably connecting the second wiper means to the first wiper means for simultaneous reciprocation therewith, said coupling means being conformable by and to said track means whereby reciprocating movement of one wiper is transmitted to the other wiper by said conformable coupling means, the operating force being applied to each wiper in the plane of its respective track means.

17. A windshield cleaner for a motor vehicle having a plane windshield portion and a curved windshield portion, comprising a track means supported by said vehicle and having a straight portion and a curved portion each of said portions being coextensive with a corresponding part of said windshield, a wiper means slidably mounted on each portion of said track means, means on one of said track means for reciprocating one of said wiper means, a coupling means slidably mounted on said track means and operably connecting the second wiper means to the first wiper means for simultaneous reciprocation therewith, said coupling means being conformable by and to said track means whereby reciprocating movement of one wiper is transmitted to the other wiper by said conformable coupling means, the operating force being applied to each wiper in the plane of its respective track means, and means on each wiper means resiliently maintaining each wiper means in wiping contact with its respective windshield portion.

18. In a motor vehicle having a plane windshield portion and a curved windshield portion, a windshield wiper comprising a wiper for said plane windshield portion, a wiper for said curved windshield portion, rectilinearly movable power driven means connected to said first named wiper for reciprocating said first wiper on the plane windshield portion, and means connecting said second named wiper to said power means to reciprocate the same, means for translating the rectilinear reciprocating motion of said power means into arcuate or curvilinear motion as applied to the second named wiper, to guide the latter in an arcuate path transversely of the major axis of said second named wiper and substantially conforming to the curvature of said curved windshield portion to wipe the same.

19. A windshield cleaner for curved windshields of motor vehicles, comprising track means substantially conforming in curvature to the surface to be cleaned, a wiper for said windshield mounted on said track means for back and forth movement, means for so reciprocating said wiper, a second wiper, mounted on said track means and spaced from said first wiper, and a connector means connecting said second wiper to said reciprocating means and itself slidably engaging said track means substantially throughout to conform to the curvature of the windshield.

ERWIN C. HORTON.